Dec. 21, 1937. A. T. FISCHER 2,102,689
METHOD OF PRODUCING RUBBER BANDS
Filed Aug. 17, 1935
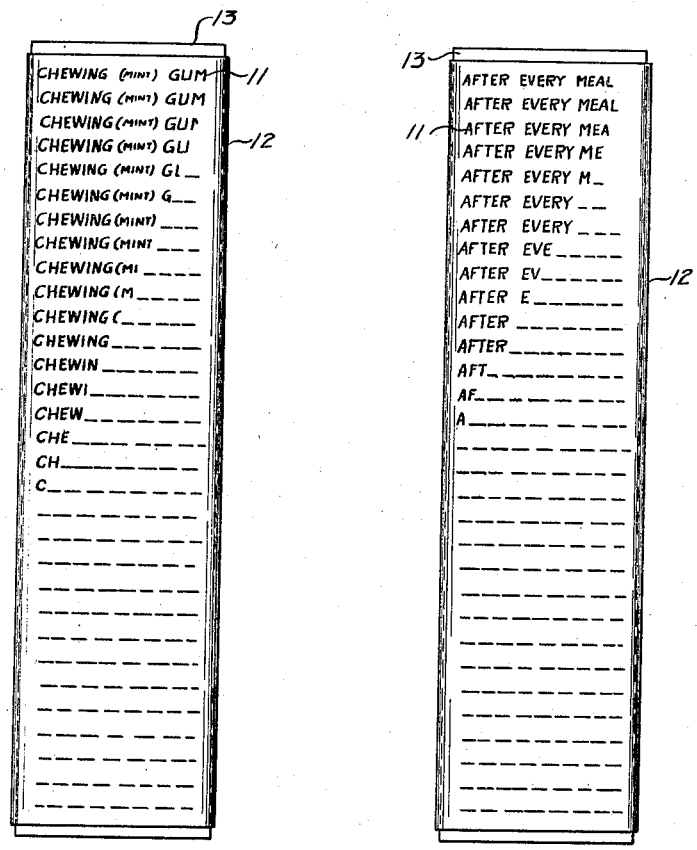

Patented Dec. 21, 1937

2,102,689

UNITED STATES PATENT OFFICE 2,102,689

METHOD OF PRODUCING RUBBER BANDS

Albert T. Fischer, Cleveland Heights, Ohio

Application August 17, 1935, Serial No. 36,751

12 Claims. (Cl. 101—426)

This invention relates to a novel form of a rubber band of the type used for packaging and sundry other purposes, and also to an improved method of producing such bands.

An object of the present invention is to provide an improved method for more accurately and economically producing rubber bands, and particularly rubber bands having advertising or other matter printed thereon.

Another object of the invention is to provide an improved method of producing rubber bands comprising forming a rubber tube, inserting a stiffening sheet into the tube and thereby holding the same stretched transversely of its axis to substantially flat collapsed condition, and cutting the tube and sheet transversely at spaced intervals to divide the tube into bands.

A further object of this invention is to provide an improved method for producing printed rubber bands comprising inserting a stiffening sheet into a rubber tube and thereby holding the same stretched transversely to substantially flat collapsed condition, printing matter on the tube at spaced intervals while in such condition, and cutting the tube and sheet transversely at spaced intervals between the printing to divide the tube into bands.

Still another object of the invention is to provide a novel rubber band having matter printed on front and back outer faces thereof.

It is also an object of this invention to provide a novel rubber band having matter printed on the inside and on the outside thereof.

Yet another object of the invention is to provide an improved method of producing printed rubber bands comprising inserting a stiffening sheet into a rubber tube and thereby holding the same stretched transversely to substantially flat collapsed condition, printing matter on the front and back outer faces of the tube while in such flat condition with the printing on one face of the tube substantially opposite the printing on the other face thereof, and cutting the tube and sheet transversely between the printing to divide the tube into bands.

A further object of this invention is to provide a novel method of producing rubber bands having matter printed on the inside thereof.

The invention may be further briefly summarized as consisting in certain novel arrangements of structure and in certain novel steps of procedure, hereinafter described and particularly set out in the appended claims.

In the accompanying sheet of drawings,

Fig. 1 is a perspective view showing a printed rubber band embodying my invention and produced according to my improved method.

Fig. 2 is a plan view of a rubber tube and stiffening sheet assembly for the production of rubber bands according to my improved method.

Fig. 3 is an end view thereof.

Fig. 4 is a plan view showing the opposite side of such assembly.

Fig. 5 is a plan view showing a section cut from a rubber tube and stiffening sheet assembly of the form shown in Fig. 2.

Fig. 6 is an edge view thereof.

Fig. 7 is a perspective view of another novel band produced by my method, and

Fig. 8 is a partial plan view illustrating the use of a printed stiffening sheet for producing rubber having printing on the inside thereof.

Proceeding now with a more detailed description of the invention, I have shown in Fig. 1 of the drawing a rubber band 10 of the type used for packaging and other purposes, and which has been produced by my improved method. In accordance with one feature of my invention the rubber band is provided on the front and back outer faces thereof with printed matter or devices 11 which may be advertising or some other information or representation. Rubber bands of this type can be readily applied to packages as a retaining or confining means, and when thus applied, the advertising or other printed matter 11 on the front and back outer faces of the band will be exposed to view.

As another feature of my invention I provide a novel method of producing rubber bands, particularly rubber bands having the above mentioned advertising matter or device 11 printed thereon. By my improved method the rubber tube 12 is more or less stiffened and held in a substantially flat collapsed condition so that it can be conveniently handled and rapidly fed to the printing and cutting apparatus. The stiffening of the tube makes it possible to print thereon the advertising or other desired matter, in one or more colors, and with rapidity and extreme accuracy. This condition of the tube also makes it possible and practical to apply such printing to the tube in correct registration on opposite sides thereof so that the printed matter will appear in proper position on the front and back of the bands which are subsequently cut from the tube.

While various means may be used for stiffening the tube and holding the same in the substantially flat collapsed condition referred to above, I find that a stiffening sheet or insert 13 of cardboard or any other suitable material serves very satisfactorily for this purpose. The stiffening sheet is inserted into the rubber tube and remains therein during the printing and cutting operations. The stiffening sheet may be in the form of a strip of approximately the same length as the tube, or may project a short distance beyond the ends thereof, as shown in the drawing. The stiffening sheet is of a width such that when inserted into the rubber tube it will maintain the tube stretched diametrically, that is, transversely of the tube axis, to a substantially flat collapsed condition. The insertion of the stiffening sheet into the rubber tube may be accomplished in any appropriate way, such as by stretching the tube transversely of its axis to permit insertion of the sheet, and then releasing the tube so that it will grip the stiffening sheet and be retained thereby in the stretched flat collapsed condition mentioned above.

The rubber tube and stiffening sheet assembly thus formed is fed to the printing apparatus and the desired printing matter is impressed on opposite outer faces of the collapsed rubber tube. Because of the flat condition of the tube and the taut condition of the rubber, the printing can be very accurately and efficiently performed in one or more colors. As shown in Figs. 2 and 4, the printing applied to the tube may consist of the matter or devices 11 arranged to extend transversely of the tube and spaced at substantially regular intervals therealong.

The substantially flat collapsed condition of the tube and tautness of the rubber, as maintained by the stiffening sheet 13, makes it possible to apply the printing to the tube so that the matter or devices applied on one side of the tube will be in opposing registration with the devices or matter applied on the opposite side of the tube. This is important because in a later operation the tube is cut transversely into the sections shown in Figs. 5 and 6 to form the rubber bands. If the printing on opposite sides of the tube is not in proper registration, it will not be possible to cut the tube into sections without cutting into the printing, particularly in cases where rubber bands of relatively narrow width are being produced. By reason of the stiffening sheet 13, however, the printing can be accurately carried out during my method, as explained above, so that when the tube is cut into sections the printing on both sides will be accurately centered on the band.

The use of the stiffening sheet or insert 13 overcomes numerous other disadvantages, such as those incident to variations in the thickness and surface characteristics of the rubber and the tendency of the rubber to twist or creep. Additionally, the stiffening sheet or insert makes possible a more rapid handling and feeding of the rubber tubes, and on the whole, greatly reduces the percentage of bands or tubes which need to be scrapped because of irregularities in the printing or other operations.

After the tube 12 has been printed, on one or both sides thereof, as shown in Figs. 2 and 4, the tube and stiffening sheet assembly is fed to a cutting device of any suitable form whereby the tube and stiffening sheet are cut transversely between the recurring printed devices 11 to thereby divide the tube into rubber bands of the desired width. The cutting operation can be more accurately and expeditiously carried out with the stiffening sheet retained in the tube, and since the cutting operation is carried out in this manner it will be seen that the sections cut from the tube will each have a section or strip 14 of the stiffening sheet 13 of corresponding width retained therein as shown in Figs. 5 and 6.

I find that by retaining the sections of the stiffening sheet in the bands cut from the rubber tube important advantages are obtained, one of which is that the rubber bands remain flat and in regular shape and can be readily placed in a container in regular order so as to present a neat and orderly package from which the individual rubber bands can be subsequently taken for use, without the need of separating or untangling the bands, as would otherwise be the case. Additionally, the severed sections of the stiffening sheet hold the bands in such shape that the printed matter or devices thereon are fully discernible, this being a factor contributing to the sales value of a package containing a quantity of printed rubber bands.

Another advantage realized from the handling of rubber bands with the sections of the stiffening sheet retained therein is that in applying the bands to packages, such as folded cards or the like, the work of applying the bands to the packages is greatly facilitated because the section of stiffening sheet already holds the band in a stretched condition and to apply the band to the package it is only necessary to insert the package into the band and, in the same operation, push or displace the section of stiffening sheet therefrom. When the bands are thus transferred from the sections of stiffening sheet to the package, it will be seen that the band will be, by the same operation, arranged on the package with the printed matter in the most advantageous position.

My invention further provides a novel rubber band having matter or devices printed on the inside thereof, and a novel method for producing rubber bands having such inside printing. In Fig. 7 I have shown a rubber band 15 which has been produced by my method and which has a device or printed matter 16 on the inside thereof. This printed matter may be any advertising or information which it is desired to have appear on the band, and may be additional to other devices or printing such as the printing 11 of Fig. 1 which may appear on one or both outer faces of the band.

In carrying out my novel method for producing bands having inside printing, I employ an insert 17 for the rubber tube 18 from which the bands are to be cut. This insert may be a stiffening sheet or strip generally similar to the insert 13, and may be of such character that it will serve the purposes explained above for the insert 13. Additionally, I provide on the stiffening sheet or insert 17 a series of the printings or devices 16 which are to appear on the inside of the bands. The printing 16 may be applied to one or both faces of the sheet 17, depending upon whether the printed matter is desired on one or both inner surfaces of the bands. This printing may be applied to the sheet in any suitable manner and by the use of appropriate ink, for example a slow-drying ink, such that when the sheet has been inserted into the tube, and the tube and sheet assembly subjected to a given treatment, the printing of the sheet will be transferred to or made to appear upon the inside of the tube.

When the tube 18 has devices or printing 11' on the outside thereof, the tube and the sheet 17 are so disposed that the printing 16 of the latter registers substantially with the printing of the tube, as shown in Fig. 8. With the tube and sheet thus arranged, the printing 16 which is transferred to the tube from the sheet will be opposite the printing 11' and when the tube is subsequently cut into bands, the printing 16 and the printing 11' will be centered on opposite sides of the band.

The treatment, to which the sheet and tube are subjected for transferring the printing 16 from the former to the latter, may consist in pressing the tube against the sheet with sufficient force to cause the transfer, or in the application of some other agency to the tube and sheet to cause such transfer.

As already indicated, the tube 18 and sheet 17 are cut transversely between the printing to divide the tube into bands. I find it desirable to have the tube and sheet subjected to pressure during the cutting operation, and if desired, this may be utilized as the pressure for transferring the printing from the sheet to the tube. However, the application of pressure for the transfer of printing from the sheet to the tube may be carried out apart from the cutting operation and by the use of any appropriate apparatus.

From the foregoing description and accompanying drawing it should now be readily seen that I have provided a novel form of rubber band which is very useful for packaging and various sundry uses, and have also provided an improved method for accurately and economically producing rubber bands, particularly rubber bands having matter printed on one or both sides thereof.

While I have disclosed my invention in a more or less detailed manner, it should be understood that I do not wish to be limited to the precise arrangements of structure and steps of procedure disclosed, but regard the invention as including such changes and modifications as do not constitute a departure from the spirit of the invention and the scope of the appended claims.

Having thus described my invention, I claim:

1. The method of making rubber bands which comprises inserting a stiffening sheet into an elastic rubber tube, and cutting the tube and sheet transversely at spaced intervals to thereby sever the tube into bands.

2. The method of making rubber bands which comprises inserting a stiffening sheet into an elastic rubber tube, cutting the tube and sheet transversely at spaced intervals to thereby sever the tube into bands, and then removing the sections of the stiffening sheet from the bands.

3. The method of making rubber bands which comprises inserting a stiffening sheet into an elastic rubber tube, cutting the tube and sheet transversely at spaced intervals to thereby sever the tube into bands, and then displacing the sections of stiffening sheet by inserting into the respective bands the members to which the bands are to be applied.

4. In a method of making rubber bands, the steps of providing a rubber tube with a stiffening sheet therein, and cutting said tube and sheet transversely at spaced intervals to thereby sever the tube into bands.

5. In a method of making rubber bands, the steps of inserting into a rubber tube a member which holds the tube stretched transversely into substantially flat collapsed condition, and cutting the tube and member transversely at spaced intervals to thereby sever the tube into bands.

6. The method of making printed rubber bands which comprises maintaining a rubber tube stretched transversely of its axis into substantially flat collapsed condition, printing matter at spaced points on the outside of the tube while in such condition, and severing the tube between the printing to divide the tube into bands.

7. The method of making printed rubber bands which comprises maintaining a rubber tube stretched transversely of its axis into substantially flat collapsed condition, printing matter at spaced points on the front and back faces of the collapsed tube with the matter printed on one face substantially opposite the matter printed on the other face, and severing the tube between the printing to divide the tube into bands.

8. The method of making printed rubber bands which comprises inserting a stiffening sheet into a rubber tube and thereby maintaining the tube stretched transversely of its axis into substantially flat collapsed condition, printing matter at spaced intervals on the outside of the tube while the latter is maintained in such condition, and cutting the tube and sheet transversely between the printing of the tube to divide the latter into bands.

9. The method of making printed rubber bands which comprises inserting a stiffening sheet into a rubber tube and thereby maintaining the tube stretched transversely of its axis into substantially flat collapsed condition, printing matter at spaced intervals on the front and back outer faces of the tube while the latter is maintained in such condition with the printing on one face substantially opposite the printing on the other face, and then cutting the tube and sheet transversely between the printing of the tube to divide the latter into bands.

10. The method of making rubber bands comprising printing matter on a sheet, inserting said sheet into a rubber tube, applying pressure to cause printing of the sheet to be transferred to the tube, and cutting the tube transversely between the printing.

11. The method of making rubber bands comprising inserting into a rubber tube a stiffening sheet having a series of devices printed thereon and maintaining the tube stretched transversely of its axis in substantially flat collapsed condition, pressing the tube against said sheet to cause the devices of the later to be printed on the inside of the tube, and then cutting the tube and sheet transversely between said devices to separate the tube into bands.

12. The method of producing rubber bands comprising cutting a rubber tube transversely into sections and meanwhile maintaining the tube in a substantially flat collapsed condition by an insert disposed therein.

ALBERT T. FISCHER.